(12) United States Patent
Fukumoto (10) Patent No.: US 8,164,781 B2
(45) Date of Patent: Apr. 24, 2012

(54) OUTPUT SYSTEM FOR UNIFYING A DOCUMENTARY FORM RELATING TO AN EVENT

(75) Inventor: Tetsuo Fukumoto, Sakurai (JP)

(73) Assignee: Sharp Kabushiki Kaisha, Osaka (JP)

( * ) Notice: Subject to any disclaimer, the term of this patent is extended or adjusted under 35 U.S.C. 154(b) by 1083 days.

(21) Appl. No.: 11/449,975

(22) Filed: Jun. 9, 2006

(65) Prior Publication Data

US 2006/0282418 A1    Dec. 14, 2006

(30) Foreign Application Priority Data

Jun. 9, 2005    (JP) ................................. 2005-169969

(51) Int. Cl.
*G06F 17/30*    (2006.01)
(52) U.S. Cl. ......... 358/1.16; 358/1.9; 358/1.15; 399/82; 399/83; 707/999.003
(58) Field of Classification Search ................... 358/1.9, 358/1.15, 1.16; 399/82, 83; 707/3, 999.003
See application file for complete search history.

(56) References Cited

U.S. PATENT DOCUMENTS

| | | | |
|---|---|---|---|
| 6,621,992 B2 * | 9/2003 | Kishi et al. ...................... 399/81 |
| 7,034,954 B1 * | 4/2006 | Utsunomiya ................ 358/1.16 |
| 7,075,670 B1 * | 7/2006 | Koga ........................... 358/1.15 |
| 2006/0115309 A1 * | 6/2006 | Matsunaga ..................... 400/62 |

FOREIGN PATENT DOCUMENTS

| | | |
|---|---|---|
| JP | 10-271248 A | 10/1998 |
| JP | 2000-025293 | 1/2000 |
| JP | 2000-029644 A | 1/2000 |
| JP | 2000-172469 | 6/2000 |
| JP | 2001-075758 | 3/2001 |
| JP | 2003-323268 | 11/2003 |
| JP | 2004-302653 | 10/2004 |

* cited by examiner

*Primary Examiner* — David K Moore
*Assistant Examiner* — Peter K Huntsinger
(74) *Attorney, Agent, or Firm* — Edwards Wildman Palmer LLP; David G. Conlin; David A. Tucker

(57) ABSTRACT

To provide an output system and an output device capable of easily unifying a documentary form relating to an event without increasing the number of work processes, in a system wherein output data is transmitted to an output device such as a printer, via a communication network from a requesting device such as a personal computer, and printing based on the output data is performed at the output device. An output device 1 records in a format information database 12*a* format information showing an output format including the documentary form of printing, correspondingly to index information showing an event. A user using a requesting device 2 makes the requesting device 2 send the output data to the output device 1 and designate the index information. The output device 1 performs output based on the output data, in the output format shown by designated index information.

14 Claims, 10 Drawing Sheets

| INDEX INFO (EVENT NAME) | FORMAT INFORMATION (PRINT SETTINGS) | | | | WATERMARK | ISSUE(S) | EFFECTIVE DURATION | |
|---|---|---|---|---|---|---|---|---|
| | SIZE | COLOR | BOTH SIDES | N-up | | | START | END |
| STANDARD | DRIVER | DRIVER | DRIVER | DRIVER | DRIVER | DRIVER | N/D | N/D |
| MTG. JAN. '05 | A4 | FULL | EFFECTIVE | 2 up | TOP SECRET | 20 | JAN 1, 2005 | FEB 1, 2005 |
| MTG. LATTER '05 | A3 | FULL | N/A | N/A | FYEO | 15 | JAN 1, 2005 | MAR 1, 2005 |
| MTG. FEB. '05 | A3 | FULL | EFFECTIVE | 2 up | TOP SECRET | 20 | FEB 1, 2005 | MAR 1, 2005 |
| DISCUSSION | A4 | B/W | EFFECTIVE | 4 up | NONE | 1 | N/D | N/D |
| FILE STORE | A4 | DRIVER | EFFECTIVE | DRIVER | NONE | 1 | N/D | N/D |
| REPORT | B5 | DRIVER | N/A | N/A | NONE | ... | N/D | N/D |
| ... | ... | ... | ... | ... | ... | ... | ... | ... |

| ITEM | RETRIEVAL CONDITION |
|---|---|
| EVENT | |
| SIZE | |
| COLOR | |
| BOTH SIDES | |
| N-up | |
| WATERMARK | |
| ISSUE (S) | |

RETRIEVAL CONDITION INPUT

| DURATION | |
|---|---|
| START | |
| END | |

PREV  RETRIEVE

DETAILED PRINT SETTINGS

| EVENT | MTG. JAN. ' 05 |
|---|---|
| SIZE | A 4 |
| COLOR | FULL |
| BOTH SIDES | EFFECTIVE |
| N-up | 2 up |
| WATERMARK | TOP SECRET |
| ISSUE (S) | 2 0 |

| DURATION | |
|---|---|
| START | JAN 1, 2005 |
| END | FEB 1, 2005 |

| PREV |

OUTPUT SYSTEM FOR UNIFYING A DOCUMENTARY FORM RELATING TO AN EVENT

CROSS-REFERENCE OF RELATED APPLICATION

This Nonprovisional Application claims priority under 35 U.S.C. §119(a) on Patent Application No. 2005-169969 in Japan on Jun. 9, 2005, the entire contents of which are hereby incorporated by reference.

BACKGROUND OF THE INVENTION

The present invention relates to an output system having a requesting device such as a personal computer for requesting output based on output data and an output device such as a printer for performing output based on the output data in accordance with a request from the requesting device, and an output device used in the output system, and particularly relates to the output system and the output device capable of setting an output format in accordance with a purpose of output.

There is a widely spread print system, in which print data is transmitted to a network printer connected to a LAN (Local Area Network) from a computer, and printing based on the print data is performed by the network printer. For example, in the print system disclosed in Japanese Patent Application Laid-Open No. 2001-75758, a function to set conditions on a printing format based on the print data is added to a printer driver which is executed on the computer side.

BRIEF SUMMARY OF THE INVENTION

However, for example, in a conventional system such as a system disclosed in Japanese Patent Application Laid-Open No. 2001-75758, an individual who uses a computer sets a format respectively. Therefore, for example, in an event such as a meeting in which a plurality of persons submit printed documents respectively, a problem involved therein is that an undesired circumstance is generated, such that formats of documents thus submitted are respectively different. In order to solve the aforesaid problem, the format is reported to each person involved in the event, and each person must set the format following a reported format, respectively. Therefore, there is the problem that entire work processes are increased.

In view of the above-described circumstances, the present invention is provided, and an object of the present invention is to provide an output system capable of easily unifying a documentary form relating to the event without increasing the work processes, and an output device used in the output system. In order to achieve this object, format information showing an output format such as a print format is corresponded to index information such as an event, and is recorded in the output device such as a printer, and output is performed in the output format corresponding to designated index information.

The output system according to the present invention comprises a requesting device requesting output based on output data, and an output device performing output based on the output data in accordance with a request from the requesting device, wherein the requesting device comprises a first communication unit for transmitting the output data to the output device, and the output device comprises a format information database, in which format information showing an output format is recorded, correspondingly to index information; a reception means for receiving designation of index information on received output data; a format extraction means for extracting the format information corresponding to the received index information from the format information database; and an output execution means for performing output based on the output data in the output format shown by the format information.

According to the output system of the present invention, the format information and the index information are corresponded to each other and recorded in the output device, and the output based on the output data is performed by the output format corresponding to the designated index information. Therefore, the format can be easily unified without increasing the work processes.

In the output system of the present invention, the output data corresponds to print data, and the output format includes the documentary form of printing, and the output execution means functions to perform printing based on the print data in the format shown by the format information, and the index information corresponds to information showing the event relating to a printed matter.

According to the output system of the present invention, the format including the documentary form of printing such as a paper size, print color, necessity of both-sides printing, necessity of N-up printing, necessity of a watermark, the number of printed matters, and effective period, is recorded in association with the information showing the event such as a meeting, storage form, and report. Therefore, by only designating the event, a uniform documentary form can be easily set, thus improving workability. In addition, the output format is recorded correspondingly to the event. Therefore, it is not necessary for each user to set the documentary form. Whereby, not only an increase of work processes of each user relating to the event can be suppressed, but also the necessity of reporting the documentary format to each user can be eliminated. Accordingly, entire work processes can be reduced.

In the output system of the present invention, the output device further comprises an index extraction means for extracting at least one piece of index information from the format information database, and a second communication unit for transmitting the pieces of extracted index information to the requesting device, and the requesting device further comprises an output unit for outputting the at least one piece of received index information, and an entry unit for receiving designation of a piece of index information from the at least one piece of outputted index information, and the first communication unit transmits the piece of index information that receives designation to the output device, and the reception means included in the output device receives the piece of inputted index information that receives designation, as the index information.

According to the output system of the present invention, the designation of the index information recorded in the output device can be conveniently performed on a requesting device side.

In the output system of the present invention, the requesting device further comprises means for receiving change of the output format shown by the format information corresponding to the piece of index information that receives designation, and the first communication unit transmits change information that shows the content of the change of the received output format, to the output device, and the output device further comprises means for changing the output format shown by the format information extracted by the format extraction means, to the content of the change of the output format shown by the received change information.

According to the output system of the present invention, the output format can be changed as needed, and therefore the format can be flexibly set.

In the output system of the present invention, plurality of pieces of format information are corresponded to a piece of index information and recorded in the format information database, and possibility of changing the output format is set in each piece of format information.

According to the output system of the present invention, the output format can be flexibly set.

In the output system of the present invention, the requesting means further comprises means for recording a history of the index information that receives designation, and means for determining an output order of received index information based on the history.

According to the output system of the present invention, when the index information designated before is designated, operability is improved.

In the output system of the present invention, the output device further comprises means for receiving a retrieval condition of the index information, and the index extraction means extracts the index information adapted to the retrieval condition.

According to the output system of the present invention, desired index information can be easily searched from the plural pieces of index information.

In the output system of the present invention, the output device further comprises means for extracting the at least one piece of index information from the format information database, and means for outputting the at least one piece of index information thus extracted, and the reception means included in the output device receives designation of a piece of index information from at least one piece of outputted index information.

According to the output system of the present invention, the operability of the output device can be improved.

In the output device of the present invention, the output device that communicates with the requesting device requesting output based on the output data and performs output based on the output data in accordance with the request from the requesting device, comprises a format information database whereby the format information showing the output format is recorded correspondingly to the index information, a communication unit that receives the output data from the requesting device, means for receiving designation of the index information on received output data, means for extracting the format information corresponding to the received index information from the format information database, and means for performing output based on the output data in the output format shown by the extracted format information.

According to the output device of the present invention, the format information is recorded correspondingly to the index information. Then, in the output format corresponding to designated index information, output based on the output data is performed. Therefore, the documentary form can be easily unified, without increasing work processes.

The output system and the output device of the present invention comprise the requesting device that uses a terminal device such as a personal computer requesting output of printed materials or the like based on the output data such as print data, and the output device such as a printer that performs output based on the output data in accordance with the request such as a print request from the requesting device. In the output device, the format information showing the output format including the documentary form of printing such as paper size, print color, necessity of both-sides printing, necessity of N-up printing, necessity of watermark, the number of printed matters, and effective period, is corresponded to the index information showing the event such as a meeting, storage form, and report, and is recorded in the format information database. Then, the user using the requesting device sends the output data to the output device from the requesting device, and designates the index information. Thus, the output device performs output based on the output data in the output format shown by designated index information.

By the structure thus described, according to the present invention, by only designating the index information showing the event, the documentary format (output format) can be easily unified, thus improving workability and exhibiting an excellent effect. In addition, the format information showing the output format is recorded correspondingly to retrieval information showing the event. Therefore, it is not necessary for each user involved in the event to set the documentary format (output format). Accordingly, not only the increase of work processes of each user involved in the event is suppressed, but also the necessity of reporting the documentary format (output format) to each user can be eliminated. Therefore, the excellent effect such as reducing entire work processes is exhibited.

The above and further objects and features of the invention will more fully be apparent from the following detailed description with accompanying drawings.

DETAILED DESCRIPTION OF THE INVENTION

Figure 1:
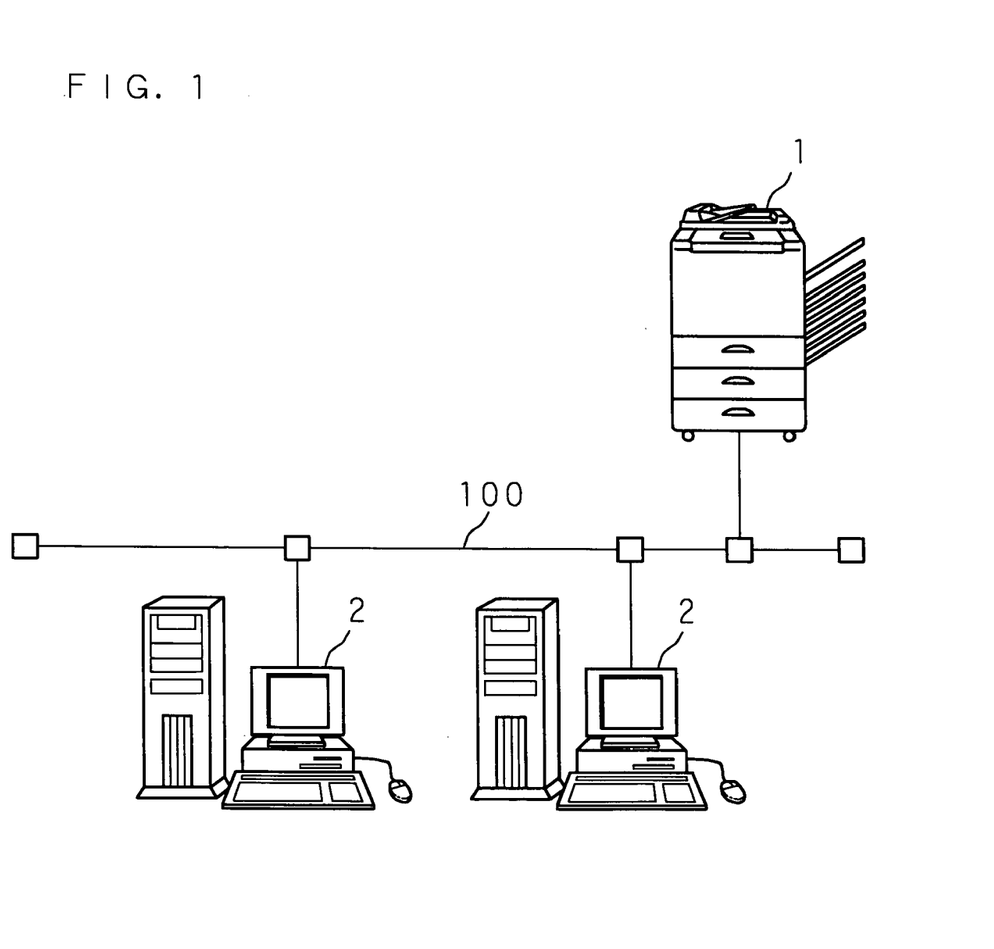
FIG. 1 is an explanatory view conceptually showing a constitutional example of an output system of the present invention.

Hereinafter, preferred embodiments of the present invention will be described in detail based on the drawings. FIG. 1 is an explanatory view conceptually showing a constitutional example of an output system of the present invention. In FIG. 1, designation mark 1 indicates an output device of the present invention such as a network printer, and an output device 1 is connected to a communication network 100 such as a LAN. A plurality of requesting devices, 2, 2, . . . are connected to the communication network 100, wherein a terminal device is used such as a personal computer that performs request of output to the output device 1. Then, by an operation of a user using the requesting device 2, the requesting device 2 requests output, by transmitting to the output device 1 output data, for example, print data described by using page describing language in a form that the output device 1 can interpret, such as a PS (PostScript) and a PCL (Printer Control Language) including the content of a document. The output device 1 performs output processing i.e. a print processing of documents, based on the output data received in accordance with the request.

Figure 2:
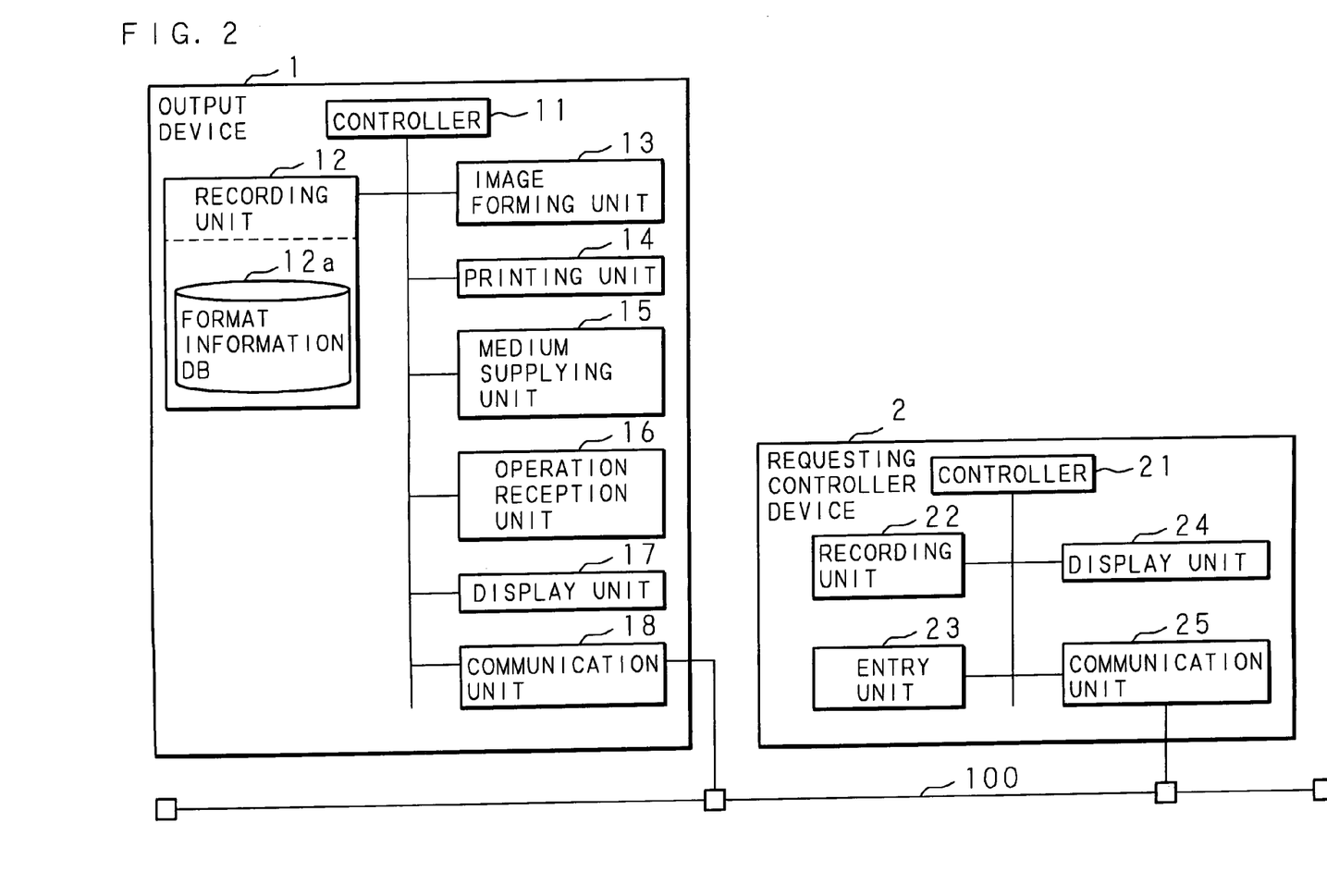
FIG. 2 is a block diagram showing the constitutional example of each kind of device provided in the output system of the present invention.

FIG. 2 is a block diagram showing the constitutional example of each kind of device provided in the output system of the present invention. The output device 1 comprises a controller 11 such as a CPU (Central Processing Unit) that controls an entire body of a device; a recording unit 12 such as a hard disk and a RAM (Random access memory) that records each kind of information such as a program and data executed by control of the controller 11; an image forming unit 13 that forms an image based on the print data; a printing unit 14 that prints the image formed by the image forming unit 13 on an output medium such as print paper and output it; a medium supplying unit 15 such as a paper tray; an operation reception unit 16 such as a touch panel and a push-button that receives operation from a user; a display unit (output unit) 17 such as a liquid crystal panel; and a communication unit 18 that communicates to a communication network 100 for receiving/sending data or information. A part of a recording area of the recording unit 12 is used as a format information database (format information DB) 12*a* that records format information showing an output format, correspondingly to index information.

The requesting device 2 comprises a controller 21, a recording unit 22, an entry unit 23 such as a mouse and a keyboard, a display unit (output unit) 24 such as a monitor, and a communication unit 25 for receiving/sending data or information. Programs recorded in the recording unit 22 are basic software (Operating System), applied software such as a word processor software for preparing documents, and a driver program used for controlling and operating peripheral equipment such as an output device 1.

Figure 3:
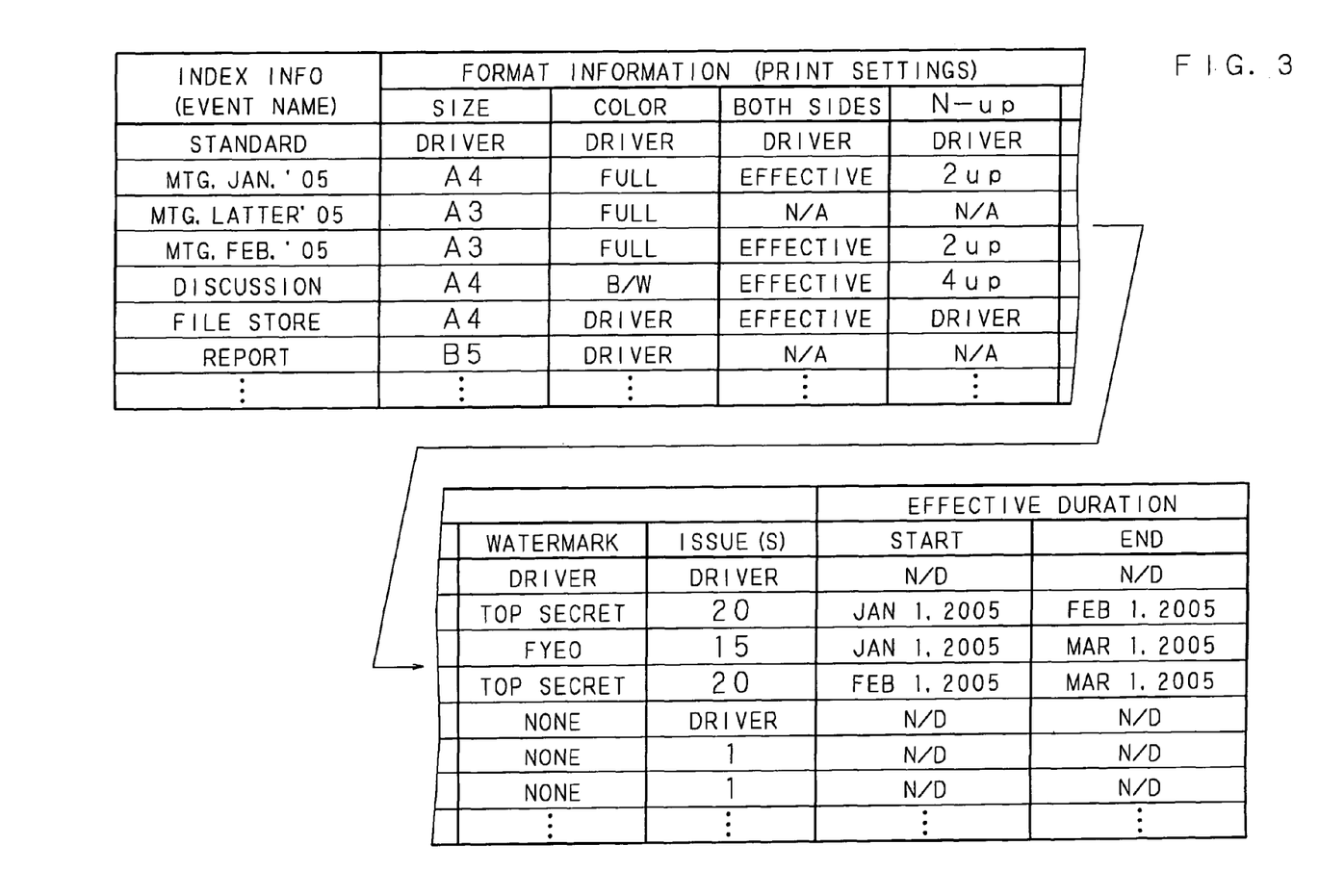
FIG. 3 is an explanatory view conceptually showing an example of recorded contents in a format information database provided in the output device of the present invention.

FIG. 3 is an explanatory view conceptually showing an example of a recorded content of the format information database 12*a* provided in the output device 1 of the present invention. A plurality of pieces of format information showing the output format of a documentary form of printing, and effective period information showing effective period, are recorded in the format information database 12*a* correspondingly to the index information showing an event. The event is an item about matters relating to a plurality of users, such as a meeting, storage form, and report, specifically such as "planning meeting in January, 2005", "File storage", and "Report". A standard shows a default setting when the event is not designated.

The format information has items such as a paper size, print color, both sides N-up, watermark, and the number of printed matters. The item of the paper size includes data showing a paper standard such as "A4" and "B5". The item of the print color includes data showing color used in printing such as "full color" and "black and white". The item of the both sides includes data showing presence or absence of execution of both sides printing such as "effective" and "not available". The item of the N-up printing includes data showing the presence or absence of the execution of N-up printing that edits a plurality of pages such as "2 up", "4 up", and "not available", so that they are printed in one page. The item of the watermark includes data showing the necessity of the watermark that becomes a background of "top secret", "for your eyes only", "none", etc, and characters when watermarking is performed. The item of the number of printed matters includes data showing the number of printed matters, such as "20" and "15". When the data of each item shows "following a driver", it shows that each item is set in the requesting device 2. Also, an attribute of possibility of change by the user is set in the data of each item recorded as the format information.

The effective period information includes data showing start date and completion date whereby date is set or not determined is set.

Figure 4A:
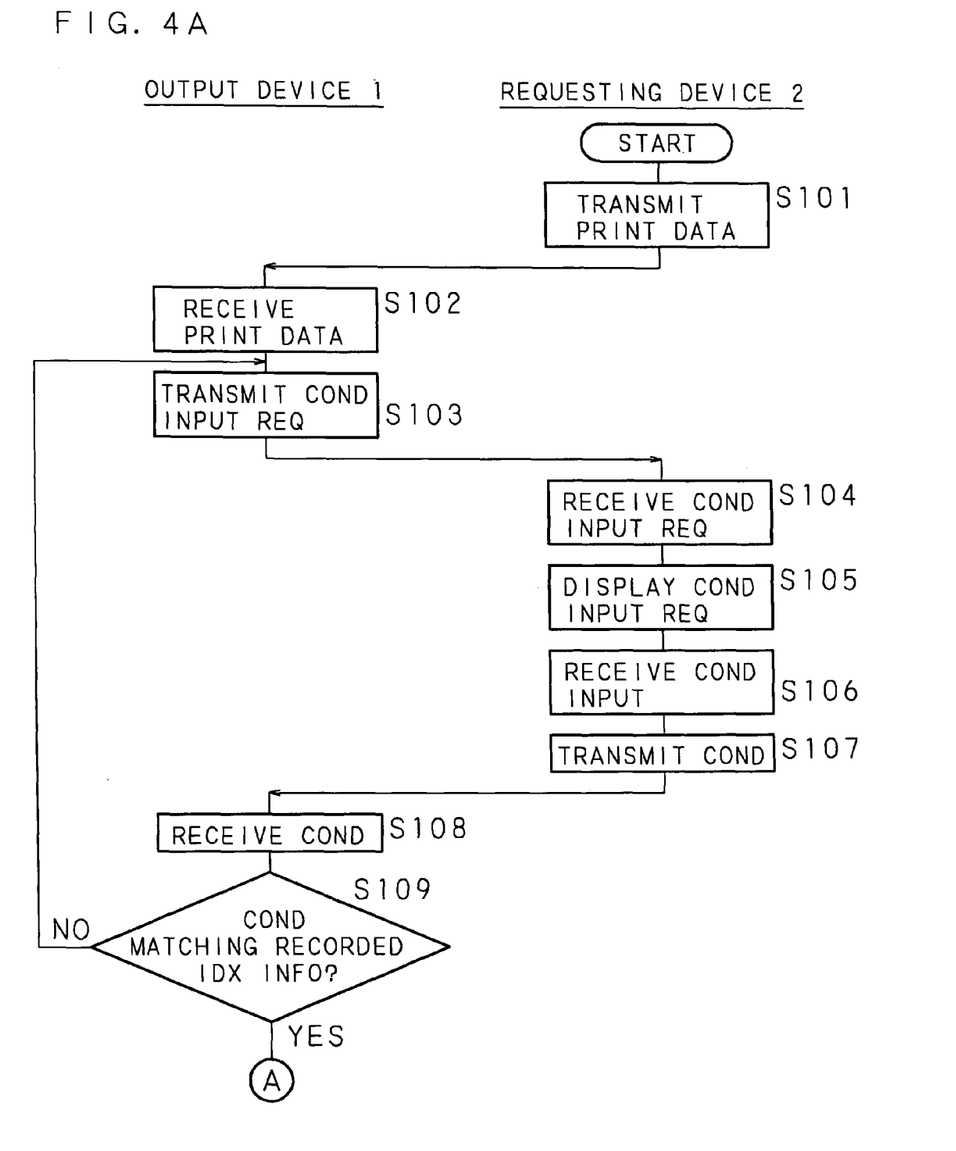
FIGS. 4A and 4B are flowcharts showing the processing of an output device and a requesting device provided in the output system of the present invention.
Figure 4B:
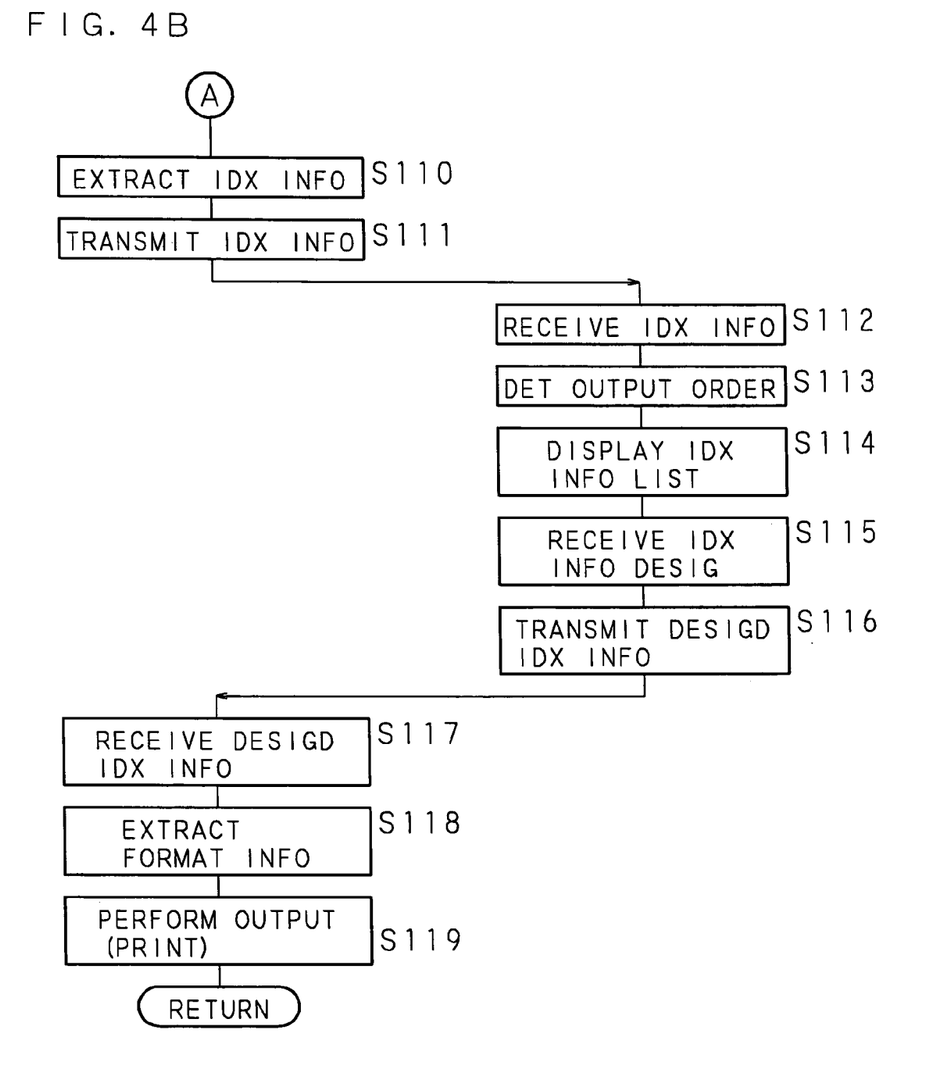

Next, the processing of each kind of device used in the output system of the present invention will be explained. FIGS. 4A and 4B are flowcharts showing the processing of the output device 1 and the requesting device 2 provided in the output system of the present invention. The user, who prepares a document by operating the requesting device 2, operates the requesting device 2 to request printing of the document thus prepared. By the control of the controller 21, the requesting device 2 receives the operation from the entry unit 23 and transmits print data (output data) to the output device 1 from the communication unit 25 via the communication network 100 (S101).

By the control of the controller 11, the output device 1 receives the print data at the communication unit 18 (S102). The output device 1 transmits a retrieval condition input request for requesting input of a retrieval condition required for searching the index information recorded in the format information database 12*a*, to the requesting device 2 from the communication unit 18, via the communication network 100 (S103). The print data received in the step S102 is temporarily recorded in the recording unit 12.

By the control of the controller 21, the requesting device 2 receives the retrieval condition input request at the communication unit 25 (S104), and displays (outputs) the image based on the received retrieval condition input request, on the display unit (output unit) 17 (S105).

Figure 5:
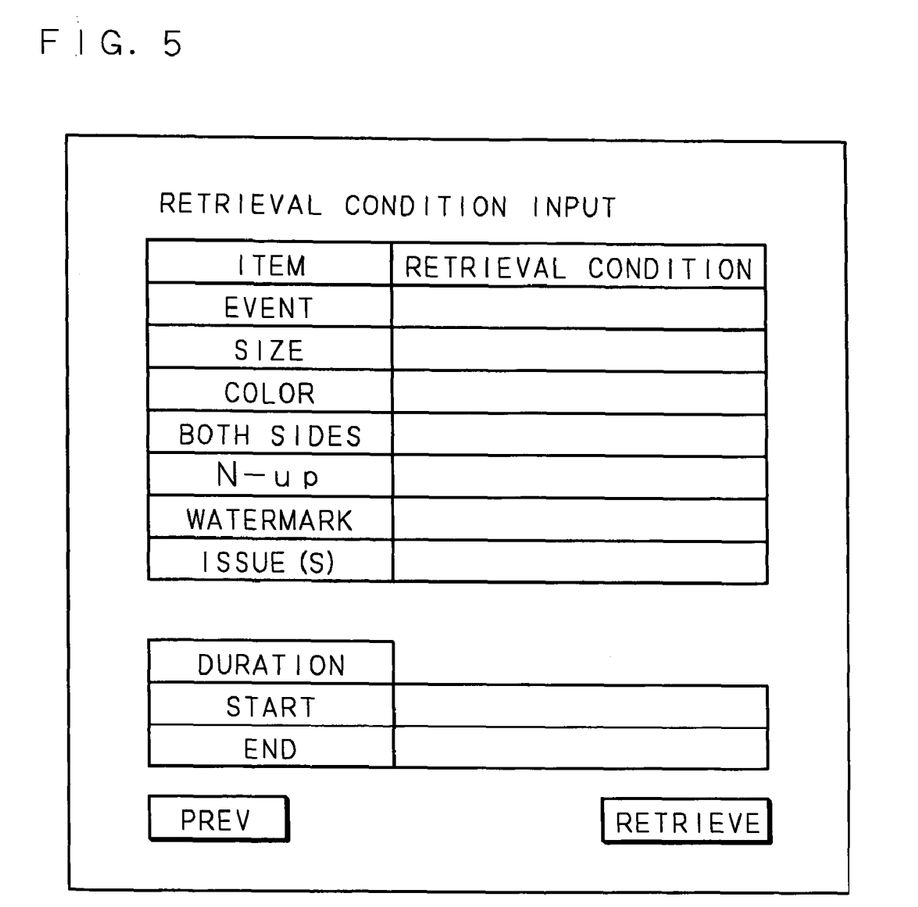
FIG. 5 is an explanatory view showing an image displayed on a display means of the requesting device provided in the output system of the present invention.

FIG. 5 is an explanatory view showing the image displayed on the display unit 17 of the requesting device 2 provided in the output system of the present invention. FIG. 5 shows the image displayed based on the retrieval condition input request, and a word, "retrieval condition input" is shown in an upper part as a title. In the lower part of the title, items of the index information, the format information, and the effective period information as retrieval keys, i.e. retrieval items, and an entry field as the retrieval condition are correspondingly displayed. As the index information which is the retrieval key, the item of an event name is shown. As the format information which is the retrieval key, items of the paper size, print color, both sides, N-up, watermark; and the number of printed matters are shown. Further, as the effective period information which is the retrieval key, the items of the start date and completion date are shown. Further, in the lowest part, a command image shown as "previous" and a command image shown as "retrieve" are displayed. The requesting device 2 starts retrieval processing when the user performs input operation such as operating the entry unit 23, inputs the retrieval condition in a desired entry field, and designates the command image shown as "retrieve".

When explanation is returned to the flowcharts shown in FIGS. 4A and 4B for continuing to explain the processing of the output device 1 and the requesting device 2 provided in the output system of the present invention, the requesting device 2 receives the retrieval condition input from the entry unit 23 by the control of the controller 21 (S106), and transmits the received retrieval condition to the output device 1 from the communication unit 25 via the communication network 100 (S107).

By the control of the controller 11, the output device 1 receives (inputs) the retrieval condition at the communication unit 18 (S108), and determines whether or not the index information matching the received retrieval condition is recorded in the format information database 12a (S109).

In the step S109, when the output device 1 determines that the index information matching the retrieval condition is not recorded in the format information database 12a (S109: NO), by the control of the controller 11, the processing is returned to the step S103, and the output device 1 repeats continual processing after the processing of transmitting the retrieval condition input request.

In the step S109, when the output device 1 determines that the index information matching the retrieval condition is recorded in the format information database 12a (S109: YES), by the control of the controller 11, the output device 1 extracts one or a plurality of pieces of index information matching the retrieval condition, from the format information database 12a (S110), and transmits the extracted index information to the requesting device 2 from the communication unit 18 via the communication network 100 (S111). The retrieval processing of steps S103 to S1110 is not necessarily required. When few pieces of index information are recorded in the format information database 12a, for example, all pieces of index information may be extracted from the format information database 12a and transmitted.

By the control of the controller 21, the requesting device 2 receives the index information at the communication unit 25 (S112), and determines the output order of the received index information based on a recorded history (S113). Then, the image showing a list of the index information rearranged based on the determined output order is displayed on the display unit 17 (S114). The index information displayed on the display unit 17 is the list for designating the index information desired by the user, and the recorded history is the history designated by past index information.

Figure 6:
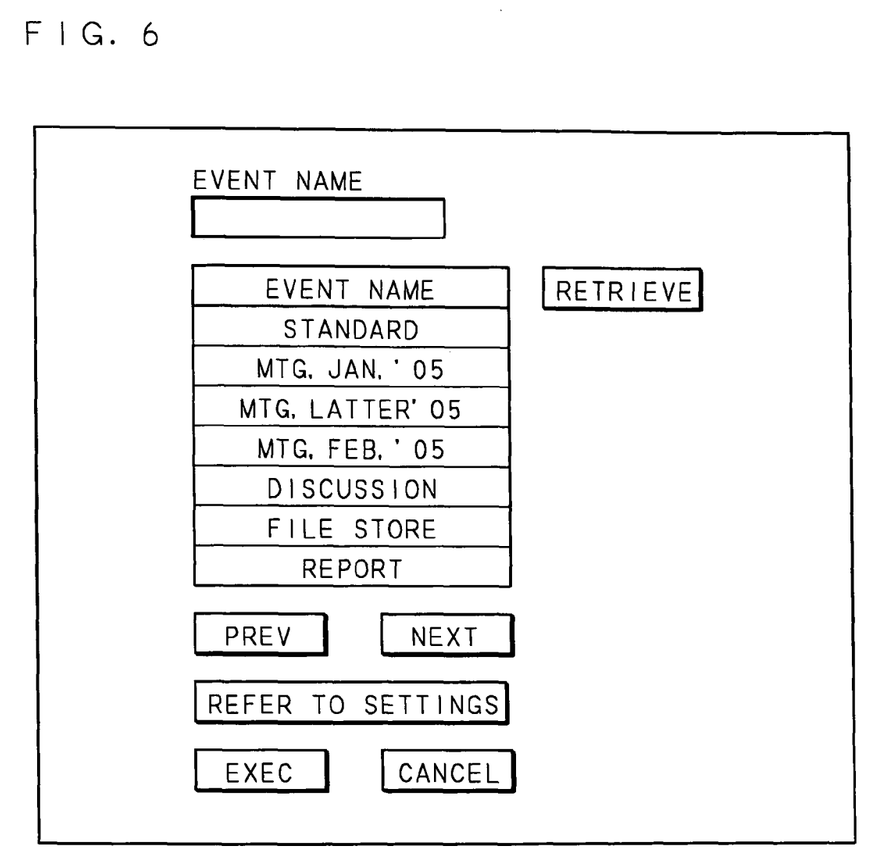
FIG. 6 is an explanatory view showing the image displayed on the display means of the requesting device provided in the output system of the present invention.

FIG. 6 is an explanatory view showing the image displayed on the display unit 17 of the requesting device 2 provided in the output system of the present invention. FIG. 6 shows the image showing the list of the index information, and in the vicinity of the center, the list of the index information is displayed with the title of "event name". The index information shown as the list is rearranged in the output order determined based on the history. By input to designate the command image shown as "previous" or "next" displayed below the list, the index information of former order or next order can be outputted. Then, by input to designate desired index information from the index information shown as the list, name (event name) of the designated index information is displayed in a field shown in an upper part of the image. After the index information is designated, by input to designate the command image shown below the image as "refer to print settings", the list of the format information which is corresponded to the designated index information is displayed. Settings of the displayed format information can be changed. Also, by input to designate the command image shown below the image as "execute", the designation of the index information is completed, and by input to designate the command image shown as "cancel", the designation of the index information is canceled.

Hereafter, explanation will be given to the processing which is performed when the index information is designated from the image shown in FIG. 6. Returning to the flowcharts shown in FIGS. 4A and 4B, the processing of the output device 1 and the requesting device 2 provided in the output system of the present invention will be explained. By the control of the controller 21, the requesting device 2 receives the designation of the index information from the entry unit 23 (S115), and transmits the designated index information to the output device 1 from the communication unit 25 via the communication network 100 (S116). The index information that receives designation is recorded in the recording unit 22 as a history.

By the control of the controller 11, the output device 1 receives (inputs) the designated index information at the communication unit 18 (S117), and extracts the format information recorded correspondingly to the received index information from the format information database 12a (S118). The image based on the print data is formed by the image forming unit 13 in the output format shown by the format information thus extracted, and the output (print) of the image thus formed is performed by the printing unit 14 (S119). Note that the outputted print data corresponds to the print data (output data) received in the step S102 and temporarily recorded in the recording unit 12.

Figure 7:
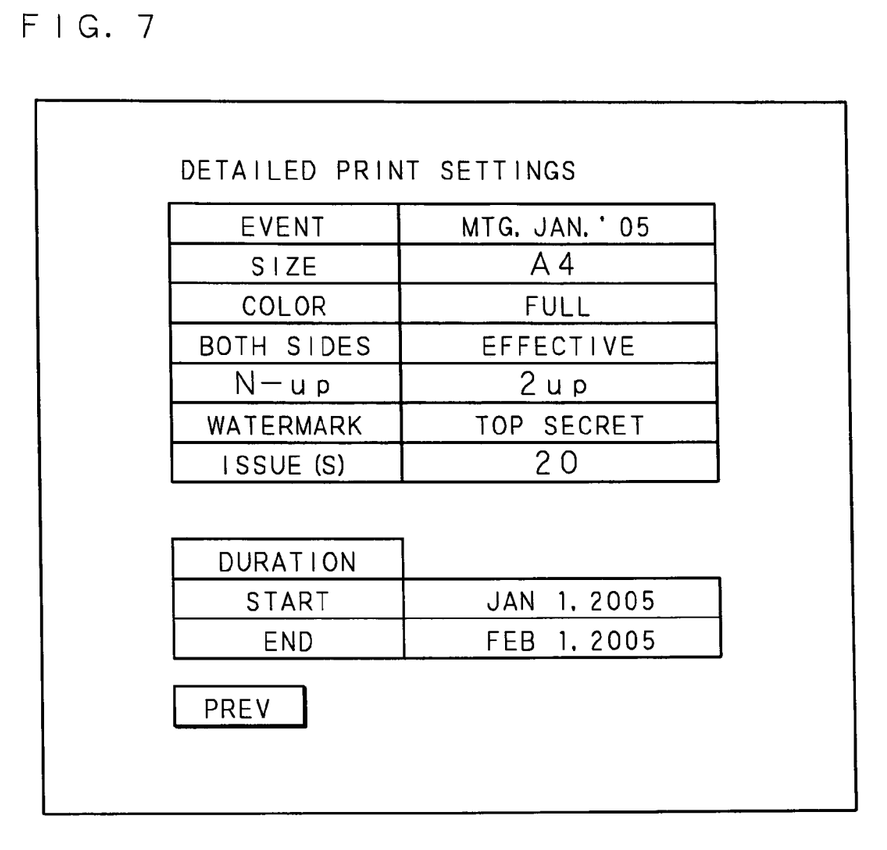
FIG. 7 is an explanatory view showing the image displayed on the display means of the requesting device provided in the output system of the present invention.

FIG. 7 is an explanatory view showing the image displayed on the display unit 17 of the requesting device 2 provided in the output system of the present invention. FIG. 7 shows the image displayed on the display unit 17, when the index information is designated from the image shown in FIG. 6, and input is performed for designating the command image shown as the print setting reference. When the input is performed for designating the command image shown as the print setting reference, the requesting device 2 accesses the output device 1, and extracts the format information recorded in the format information database 12a of the output device 1, correspondingly to the index information, and displays the image shown FIG. 7 on the display unit 17. The word, "detailed print settings" is shown in the upper part of the displayed image as a title, each item of the index information, format information, and effective period information, and the data corresponded to each item are recorded in the lower part. The attribute of possibility of the change by the user is set in each item thus displayed, and as to changeable data, the change is possible by input of the user.

Figure 8:
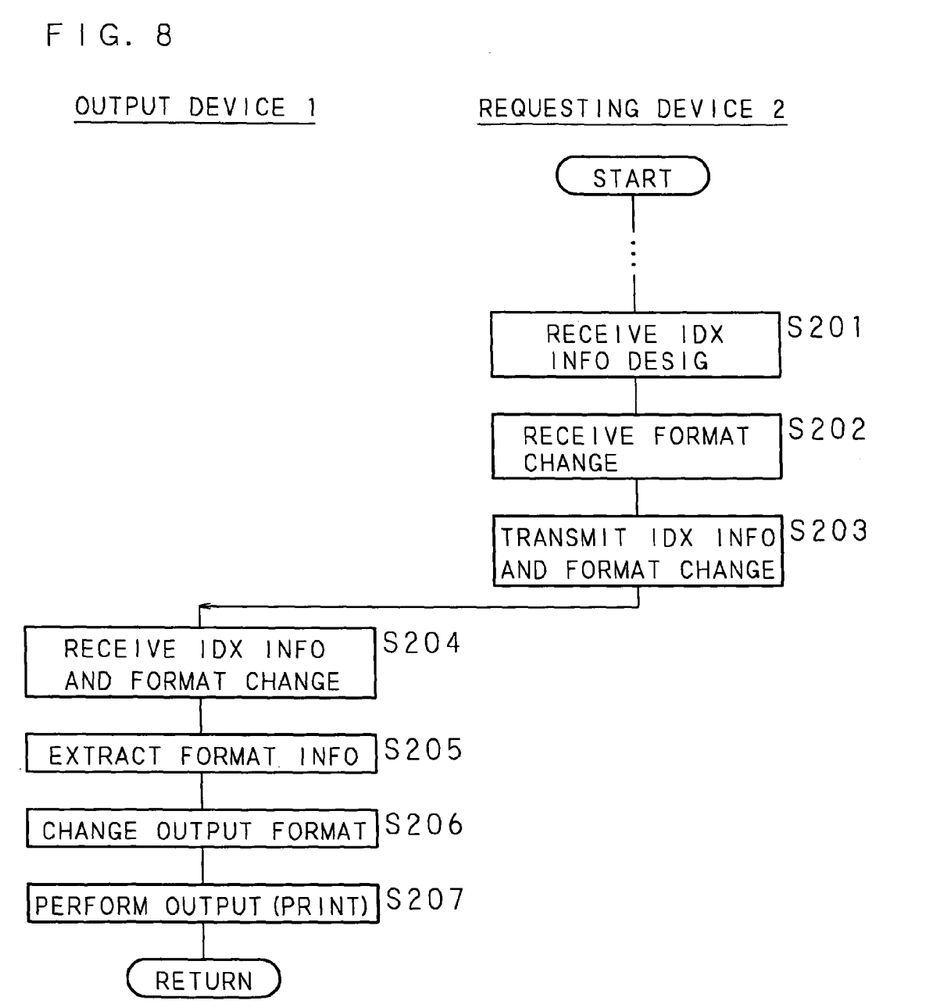
FIG. 8 is a flowchart showing the processing of the output device and the requesting device provided in the output system of the present invention.

Next, the processing when the data of the format information is changed by the user will be explained. FIG. 8 is a flowchart showing the processing of the output device 1 and the requesting device 2 provided in the output system of the present invention. The flowchart shown in FIG. 8 shows the processing of changing the data of the format information from the image shown in FIG. 7. The processing up to displaying the image showing the list of the index information on the display unit 17 is the same as the processing up to step S114 of the flowchart. Therefore, the explanation thereof is omitted by referring to the flowcharts of FIGS. 4A and 4B and the explanation thereof. By the control of the controller 21, the requesting device 2 receives the designation of the index information from the entry unit 23 (S201), and further receives the input of changing the output format shown by the format information (S202). The received index information and change information showing the content of the change of the output format are transmitted from the communication unit 25 via the communication network 100, (S203).

By the control of the controller 11, the output device 1 receives (inputs) the index information and change information at the communication unit 18 (S204); and extracts the format information recorded correspondingly to the received index information, from the format information database 12a (S205). The output format shown by the extracted format information is changed to the content of the change shown by the change information (S206), and the image based on the print data is formed by the image forming unit 13 in the output format hereby the content is changed, and the output (print) of the image thus formed is performed by the printing unit 14 (S207).

Note that it is also possible that the designation of the format information is not inputted to the requesting device 2, but directly inputted to the output device 1.

Figure 9:
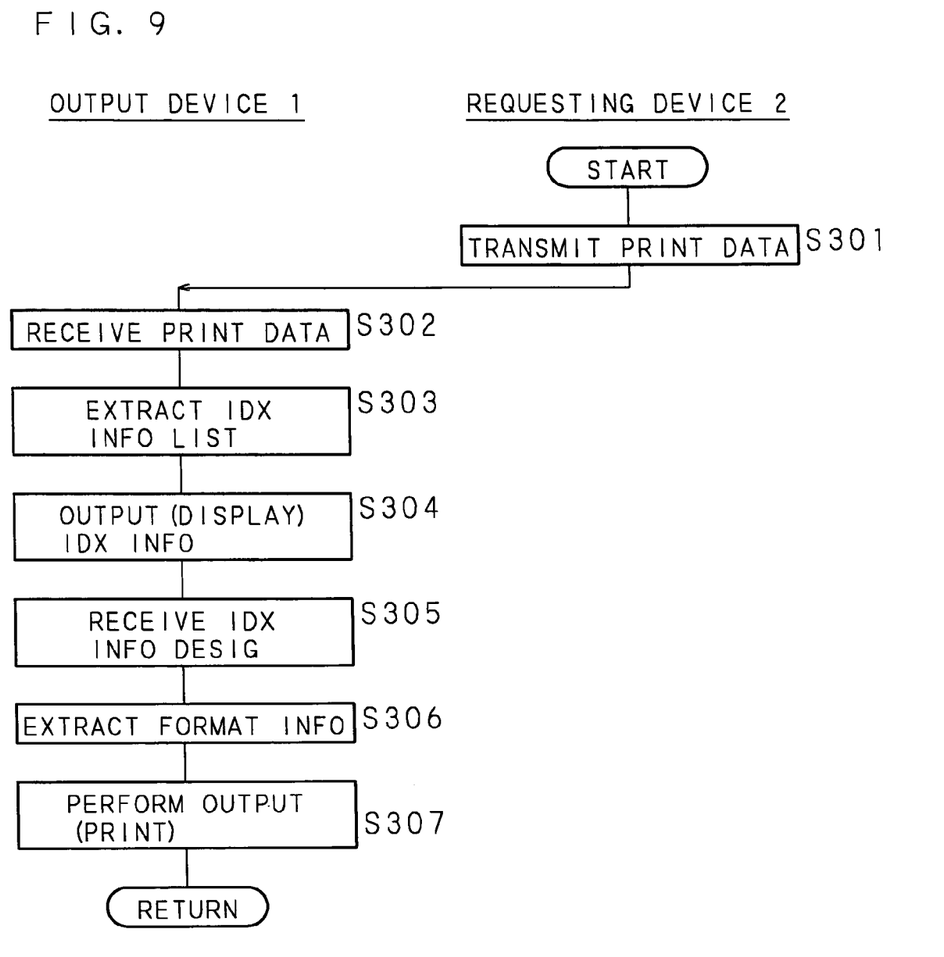
FIG. 9 is a flowchart showing the processing of the output device and the requesting device provided in the output system of the present invention.

Next, other embodiments of directly inputting the designation of the format information in the output device 1 will be explained. FIG. 9 is a flowchart showing the processing of the output device 1 and the requesting device 2 provided in the output system of the present invention. By the control of the controller 21, the requesting device 2 transmits the print data to the output device 1 from the communication unit 25 via the communication network 100 (S301).

By the control of the controller 11, the output device 1 receives the print data at the communication unit 18 (S302), and extracts the list of the index information from the format information database 12a (S303), and outputs (displays) the extracted index information from the display unit 17 (S304). The user performs input of designating the desired index information from the index information displayed on the display unit 17.

By the control of the controller 11, the output device 1 receives the designation of the index information from the operation reception unit 16 (S305), and extracts the format information recorded correspondingly to the received index information, from the format information database 12a (S306). The image based on the print data is formed by the image forming unit 13, in the output format shown by the extracted format information, and the output of the image thus formed is performed by the printing unit 14 (S307). The retrieval processing may also be performed in an embodiment directly receiving the designation of the index information by the output device 1.

In the embodiments as described above, the output data corresponds to the print data, and printing is performed as the output based on the print data. However, the present invention is not limited thereto, various variants can be developed, such that the output data is the data for facsimile, and facsimile transmission is carried out as the output based on the output data.

As this invention may be embodied in several forms without departing from the spirit of essential characteristics thereof, the present embodiments are therefore illustrative and not restrictive, since the scope of the invention is defined by the appended claims rather than by description preceding them, and all changes that fall within metes and bounds of the claims, or equivalence of such metes and bounds thereof are therefore intended to be embraced by the claims.

The invention claimed is:

1. An output system, comprising a requesting device that requests output based on output data, and an output device that performs output based on the output data in accordance with a request from the requesting device, wherein
the requesting device comprises:
a first communication unit for transmitting the output data to the output device,
the output device comprises:
reception means for receiving the received output data and index information on the received output data;
a format information database in which format information showing an output format of the output data has been recorded when the output data is transmitted to the output device, corresponding to index information, wherein the index information is information showing an event relating to the output data;
index extraction means for extracting at least one piece of index information from the format information database;
a second communication unit for transmitting the pieces of index information thus extracted to the requesting device,
format extraction means for extracting the format information corresponding to the received index information, from the format information database; and
output execution means for performing output based on the output data, in an output format shown by the extracted format information;
the requesting device further comprises:
an output unit for outputting the at least one piece of index information thus received; and
an entry unit for receiving a designation of a piece of index information from the at least one piece of index information thus outputted, wherein;
the first communication unit transmits the piece of index information that has received designation, to the output device, and
wherein the reception means included in the output device receives the piece of index information that receives designation, as the index information.

2. The output system according to claim 1, wherein
the output data corresponds to print data,
the output format includes a documentary form of printing,
the output execution means performs printing based on the print data, in the documentary form shown by the format information, to prepare printed materials, and
the index information corresponds to information showing an event relating to the printed materials.

3. The output system according to claim 1, wherein
the requesting device further comprises means for receiving change of the output format shown by the format information corresponding to the piece of index information that has received designation,
the first communication unit transmits to the output device change information showing content of the change of the output format thus received, and
the output device further comprises means for changing the output format shown by the format information extracted by the format extraction means, to the content of the change of the output format shown by the received change information.

4. The output system according to claim 3, wherein
a plurality of pieces of format information are recorded in the format information database, corresponding to a piece of index information, and
a possibility of the change of the output format is set in each piece of format information.

5. The output system according to claim 1, wherein
the requesting device further comprises:
means for recording a history of the index information that has received designation; and
means for determining an output order of received index information based on the history.

6. The output system according to claim 1, wherein
the output device further comprises means for receiving a retrieval condition of the index information, and
the index extraction means extracts the index information that adapts to the retrieval condition.

7. The output system according to claim 1, wherein the output device further comprises:
- means for extracting at least one piece of index information from the format information database; and
- means for outputting the at least one piece of index information thus extracted, and wherein:
- the reception means included in the output device receives a designation of a piece of index information from the at least one piece of index information thus outputted.

8. An output system, comprising a requesting device that requests output based on output data and an output device that performs output based on the output data in accordance with a request from the requesting device, wherein the requesting device comprises:
- a first communication unit for transmitting the output data to the output device, and the output device comprises:
- a format information database in which format information showing an output format of the output data has been recorded when the output data is transmitted to the output device, corresponding to index information, wherein the index information is information showing an event relating to the output data;
- an operation reception unit for receiving designation of the index information on received output data; and
- a controller capable of:
  - extracting the format information corresponding to the received index information, from the information database; and
  - performing output based on the output data, in the output format shown by the extracted format information;

wherein
- the controller of the output device is further capable of extracting at least one piece of index information, from the format information database,
- the output device further comprises:
  - a second communication unit for transmitting the pieces of index information thus extracted, to the requesting device,
- the requesting device further comprises:
  - an output unit for outputting the at least one piece of index information thus received; and
  - an entry unit for receiving a designation of a piece of index information from the at least one piece of index information thus outputted,
  - wherein:
    - the first communication unit transmits the piece of index information that receives designation, and
    - the controller of the output device is further capable of receiving piece of inputted index information that receives designation, as the index information.

9. The output system according to claim 8, wherein the output data corresponds to print data, the output format includes a documentary form of printing, the output device further comprises:
- an image forming unit for forming an image based on the print data in the output format shown by the format information; and
- a printing unit for preparing printed materials by performing printing based on the image thus formed, wherein
- the index information corresponds to information showing an event relating to the printed materials.

10. The output system according to claim 8, wherein
the entry unit receives change of the output format shown by the format information corresponding to the piece of index information that receives designation,
the first communication unit transmits change information showing content of the change of the output format thus received, and
the controller of the output device is further capable of changing the output format shown by the extracted format information, to the content of the change of the output format shown by the received change information.

11. The output system according to claim 10, wherein
a plurality of pieces of format information are recorded in the format information database, corresponding to a piece of index information, and
a possibility of the change of the output format is set in each piece of format information.

12. The output system according to claim 8, wherein the requesting device further comprises:
- a recording unit for recording a history of the index information that receives designation; and
- a controller capable of determining an output order of received index information based on the history.

13. The output system according to claim 8, wherein
the operation reception unit receives a retrieval condition of the index information, and
the controller comprised by the output device is further capable of extracting the index information adapted to the retrieval condition.

14. The output system according to claim 8, wherein the controller comprised by the output device is further capable of:
- extracting at least one piece of index information from the format information database; and
- outputting the at least one piece of index information thus extracted, and
- the operation reception unit receives designation of a piece of index information from the at least one piece of index information thus outputted.

* * * * *